United States Patent [19]
Newell

[11] Patent Number: 5,407,727
[45] Date of Patent: Apr. 18, 1995

[54] POROUS LOAD BEARING MATERIALS

[75] Inventor: Kenneth J. Newell, Santa Monica, Calif.

[73] Assignee: Rockwell International Corporation, Seal Beach, Calif.

[21] Appl. No.: 956,181

[22] Filed: Oct. 5, 1992

[51] Int. Cl.⁶ .................. A47G 19/22; B32B 3/20; B32B 31/04; D04H 1/58
[52] U.S. Cl. .................... 428/188; 428/34.5; 428/34.6; 428/288; 428/398; 264/258; 264/314; 165/185
[58] Field of Search ............... 428/34.1, 34.5, 34.6, 428/188, 289, 325, 402, 398; 264/258, 314; 165/185

[56] References Cited

U.S. PATENT DOCUMENTS 4,175,153 11/1979 Dobo et al. ............... 428/398
4,671,994 6/1987 Cochran ................... 428/325
4,863,771 9/1989 Freeman ................... 428/36.1

Primary Examiner—George F. Lesmes
Assistant Examiner—Kathryne E. Shelborne
Attorney, Agent, or Firm—Terrell P. Lewis; Charles T. Silberberg

[57] ABSTRACT

A novel composition comprising a metal or ceramic matrix material includes a reinforcing system of hollow, similarly aligned carbon-coated ceramic fibers which provide high strength, increased creep resistance and a significant reduction in weight. Also disclosed is a novel structural component incorporating the reinforcing system of hollow fibers to provide a mechanism enabling fluids or gases to pass or be injected through the element fibers for cooling or other functions. A method for fabricating the hollow fiber-reinforced component is also disclosed. Various applications for the fiber-reinforced structural component are also disclosed.

5 Claims, 3 Drawing Sheets

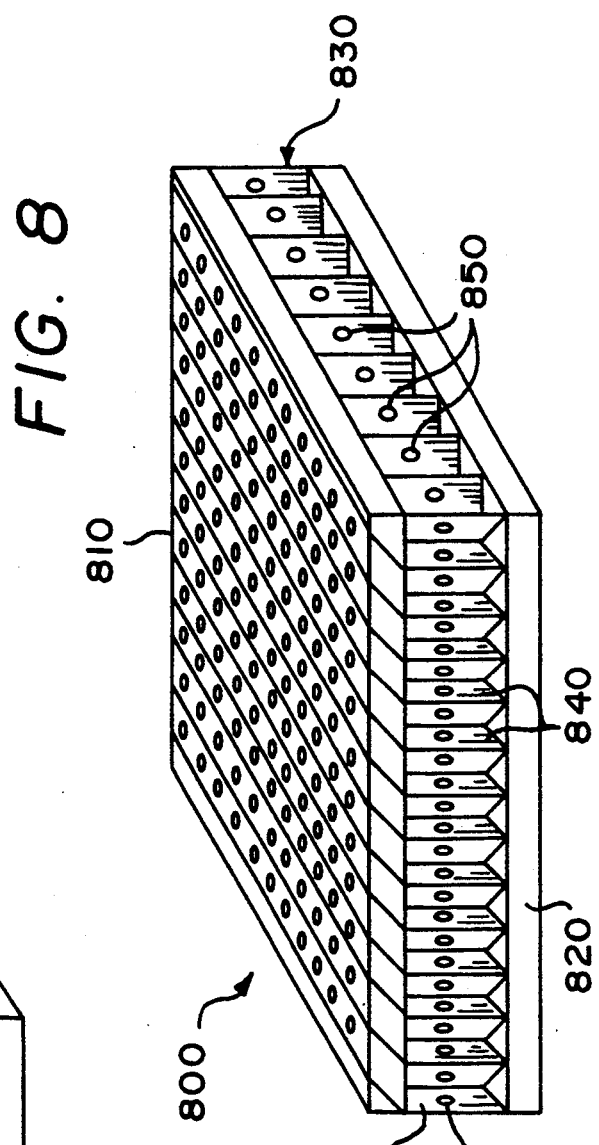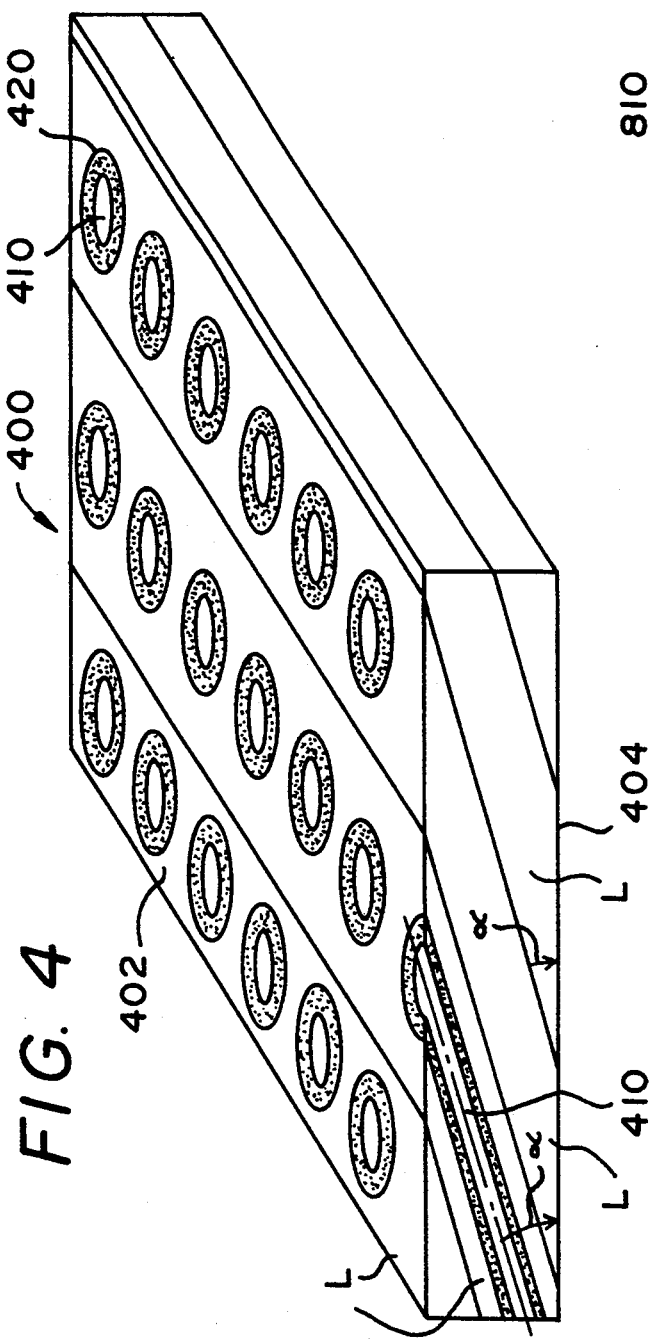

POROUS LOAD BEARING MATERIALS

BACKGROUND OF THE INVENTION

1. Field of the Invention

The present invention relates to the fabrication of high strength, creep resistant, structural components using reinforcing fibers, and more particularly to lightweight, porous, composite structural components incorporating high strength, hollow reinforcing fibers, a method for making the fibers and products made using the fibers for reinforcing the composite materials.

2. Background of the Invention

The need for new materials with high specific strength and creep resistance has prompted development of advanced methodologies for obtaining enhanced composite materials. A large portion of these efforts have been centered around the use of continuous fibers for reinforcement of ceramic and metal matrix composites.

It is well-known to use fiber reinforcement systems in composite materials for enhancing the strength and stiffness properties exhibited by those materials. For many years, the most commonly used fibers in the aerospace Industry were solid with a substantially circular cross section.

Very recently hollow fibers exhibiting improved mechanical properties have been developed. Such hollow fibers have been considered especially useful in augmenting compressive strength. Various processes for the production of hollow fibers are known. For example, U.S. Pat. No. 4,175,153 to Dobo et al. teaches various processes for making, and applications for using, hollow fibers in the production of substantially pure hydrogen. Composites using these hollow fibers are embodied as membranes and membrane support structures for gas diffusion or fluid separation application, as well as apparatus for fuel cell and other catalyzed reactions. The inorganic materials of which the Dobo et al. fibers are made include metals such as the hydrogen diffusible, noble metals (eg. iron, nickel and their alloys). The sinterable inorganic materials can be ceramics, such as aluminum oxide and b-alumina, or cermets or mercers, such as iron metal/aluminum oxide and nickel metal/titanium carbide.

In the aerospace industry, however, reinforcement fibers, both solid and hollow, are typically selected from organic materials (eg., glass, carbon or aramid), ceramic materials, (eg, quartz, alumina or silicon carbide) and metallic materials. Of these choices, reinforcement fiber systems made of ceramic materials are favored for their ability to withstand high temperatures and to provide excellent insulation against extreme heat. For example, it is known that a silicon carbide (SiC) fiber can retain significant strength above 1800° F. (980° C.), and that the SiC material offers high heat resistance up to 2200° F. (1200° C.). In addition, SiC exhibits excellent wetting properties and oxidative resistance allowing fibers of this material to reinforce polymers, polyimides, ceramics and metals.

With all this knowledge, nevertheless there is still a great need for an improved structural material including a metal matrix composition incorporating a fiber-reinforcing system which yields a light weight, high strength, creep resistant composite material and which is porous to the extent that It enables liquid or gas flow through preselected regions of the material.

OBJECTS AND SUMMARY OF THE INVENTION

It is therefore an object of the present invention to provide a novel composition comprising a metal or ceramic matrix material including a reinforcing system of fibers which exhibits high strength, increased creep resistance and a significant reduction in weight, while overcoming all the drawbacks and disadvantages of known similar fiber-reinforced compositions.

Another object of the present invention is to provide a novel structural element incorporating a system of hollow reinforcing fibers in a metal matrix, where the hollow fibers reduce overall weight of the structural element while enabling fluids or gases to pass or be injected through the element for cooling or other functions.

Another object of the invention is to provide a method of fabricating a fiber-reinforced composite material having structural properties of high strength and creep resistance, and exhibiting fluid flow-through capabilities for cooling or fuel delivery applications.

Still another object is to provide a method for producing continuous hollow reinforcing fibers comprised of a ceramic material having a high carbon outer surface layer exhibiting good wetting and bonding characteristics.

These and other objects are attained by the process and products encompassed by the present invention. The invention contemplates a process for depositing a carbon coating on a ceramic fiber core, e.g., by subjecting a hollow fiber to a chemical vapor deposition process. The invention further contemplates a method for incorporating a plurality of these hollow reinforcing fibers within a composite material and fashioning the resulting composition into a structural component. The invention further contemplates several structural components incorporating the hollow reinforcing fibers of the present invention.

BRIEF DESCRIPTION OF THE DRAWINGS

FIG. 4 shows one embodiment of a composite structural component utilizing the hollow reinforcing fibers of the present invention;

FIG. 8 depicts a transpiration cooling panel which uses the structural component of FIG. 4.

DETAILED DESCRIPTION OF THE INVENTION

The present invention concerns high temperature, high strength hollow fibers, and in particular, their manufacture, their use in reinforcing composite materials, and their further use in facilitating secondary functions advantageous to several industries including aerospace and aircraft engine technologies.

Essentially, the fiber construction contemplated by the present invention and the composites using these fibers exhibit enhanced strength and temperature properties, as well as increased creep resistance. Fiber materials which are acceptable for use in the present invention include silicon carbide materials (SCS-6 available from Textron), and SIGMA type fibers (available from British Petroleum).

The inventor has recognized that, for certain composite strengthening applications, using a coreless fiber would result in a lighter-weight reinforced structural component having the capability of transporting fluids from one environment to another or enabling introduction of fluids into an environment.

Figures 1, 2:
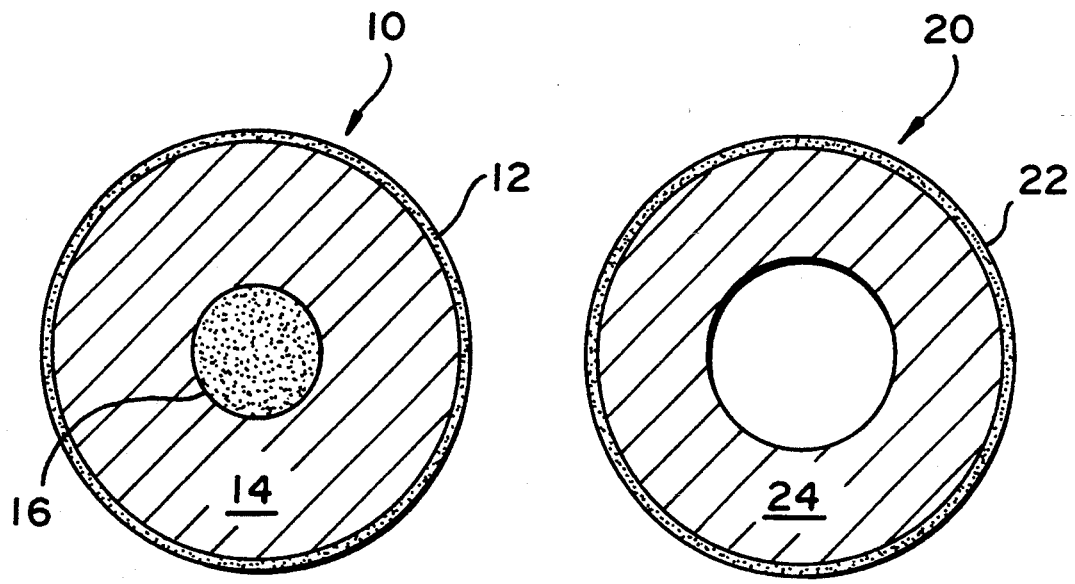
FIG. 1 is a cross-sectional view of a typical silicon carbide fiber with a carbon core.
FIG. 2 is a cross-sectional view of a hollow silicon carbide fiber in accordance with the present invention.

In FIG. 1, there is shown a cross-section of a typical silicon carbide (SCS-6) fiber 10 used in fiber-reinforced composite materials. The fiber includes a carbon outer layer 12, a silicon carbide middle layer 14 and a carbon core 16. The outer diameter of the fiber is typically about 140 microns. The fiber strength is approximately 500 Ksi. The laminate strength at 35% vf with titanium is approximately 250 Ksi. The fiber density is approximately 0.11 Lb/cu.in. The laminate density at 35% vf with titanium is approximately 0.14 Lb/cu.in.

FIG. 2 shows a cross-section of a fiber 20 in which the core has been removed in accordance with the core removal process contemplated by the present invention. The fiber 20 includes an outer carbon layer 22 and a hollow tubular substrate 24 made of silicon carbide. The outer diameter of the fiber is about 180 microns, while the inner diameter is about 100 microns. The fiber strength is approximately 420 Ksi. The laminate strength at 35% vf with titanium is about 250 Ksi. The fiber density is approximately 0.08 Lb/cu.in. and the laminate density at 35% vf with titanium is about 0.105 Lb/cu.in.

To obtain the fiber configuration of FIG. 2, a typical "cored" fiber such as that shown in FIG. 1 is subjected to a process by which the inner carbon core is removed. Exemplary processes are chemical (as by etching or high temperature vaporization), or mechanical (as by a milling process). An outer layer, made from a higher carbon material, is then deposited on the exterior of the now-hollow fiber. The outer higher carbon layer forms a reaction layer or sheath on the coreless fiber to achieve a better bond with the composite matrix material within which the fiber is to be disposed.

Figure 3:
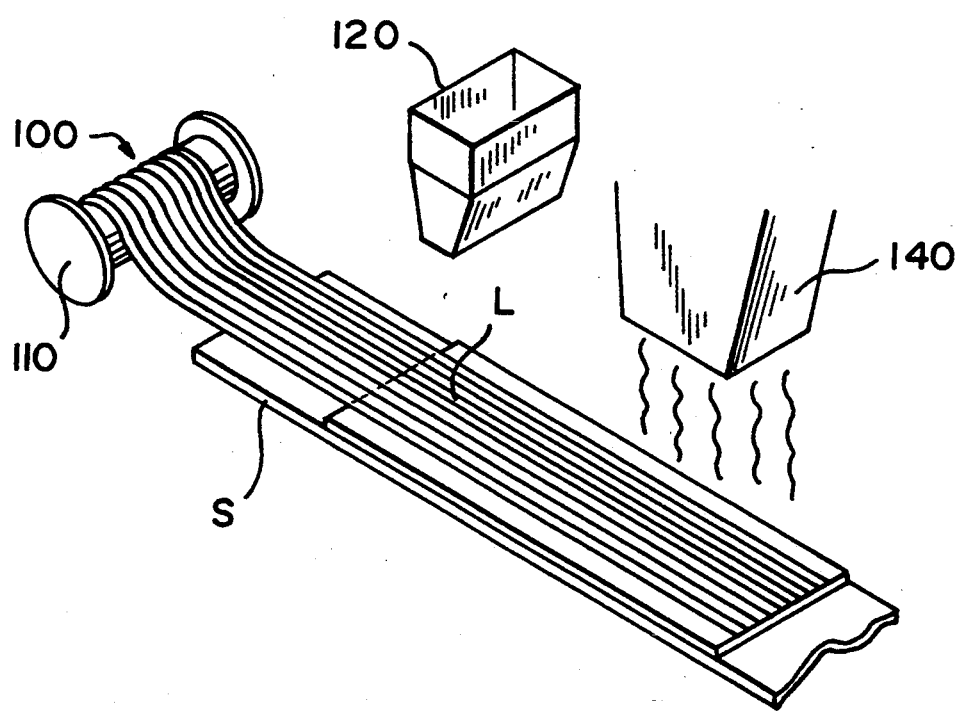
FIG. 3 is a schematic diagram illustrating the manner in which a bundle of fibers contemplated by the present invention is used to fabricate a fiber-reinforced composite.

FIG. 3 illustrates one process contemplated by the present invention for fabricating a fiber reinforced composite using hollow fibers. First, hollow fibers 100, wound on spools or reels 110, are drawn from two or more reels disposed side by side (their axes of rotation being in coincidence as shown in FIG. 3). The fibers 100 are drawn outwardly from the reels together in a side-by-side disposition where they are positioned on a bed or support S aligned in a substantially horizontal manner, as for example in the form of a lamination or layer L.

A hopper 120 is positioned at a predetermined location downstream of the reels. In the hopper is a composite material, such as a metal or ceramic powder mixed with a binder. The powdered composite material is dispensed from the hopper onto the lamination L, and the composite enriched lamination L then continues to a heating location 140 further downstream of the reels. Here, the lamination L is acted upon by heating apparatus at location 140 to effect consolidation of the fiber-augmented composite. This may be achieved by winding the lamination L on a mandrel and subjecting the mandrel to elevated heat. Another process involves the omission of the mandrel and the feeding of the lamination in mat form to the heating apparatus, as shown in FIG. 3. At this point, the entire structure is heated to a predetermined temperature, where the fibers and the composite material bond together to form a fiber-reinforced matrix composite.

While it may be possible to form structural components from a single fiber-carrying lamination, most applications contemplated by the invention will require plural lamination layers, as illustrated by the structures shown in FIGS. 4–8 of the drawings. When the structural components are formed, the coreless reinforcing fibers in the composite matrix help reduce the weight of the finished product, while at the same time increasing the specific structural strength.

Figure 7:
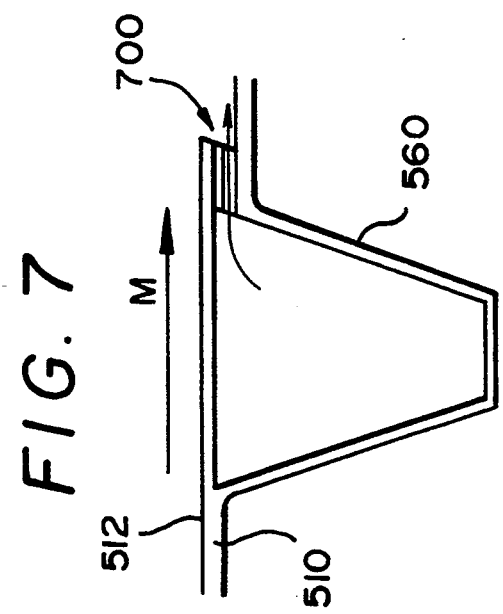
FIG. 7 is a cross-section of a second embodiment of the structural component used with the panel of FIG. 5.

FIG. 4 shows a structural component 400 comprising a plurality of fiber-reinforced laminations L laid atop one another, and end faces 402,404 cut at an angle X to the longitudinal axis of the fibers. In this structural embodiment, the hollow fibers are consolidated within a matrix composite. After the consolidation process Is completed, the opposing end faces are machined to a desired finish. The result of this process is fabrication of a structural component exhibiting flow through passages 410 which permit fluid flow through the hollow fibers 420. The passages 410 can extend at angle X as shown in FIG. 4, or parallel with the horizontal axis as shown in FIG. 7. Such passages could be used for conveying cooling fluids, heating fluids, lubricating fluids, fuels such as those which might be used in Injection systems, etc.

For example, in an application where solid partitions would be disposed in abutting relationship with the sides of the structural element, the hollow fibers could provide the function of facilitating communication between the two environments interfacing with the bottom surface and the top surface.

Figure 6:
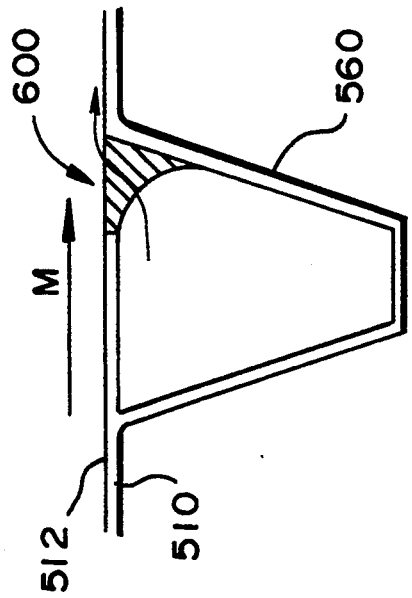
FIG. 6 is a cross-section of one embodiment of the structural component used with the panel of FIG. 5.
Figure 5:
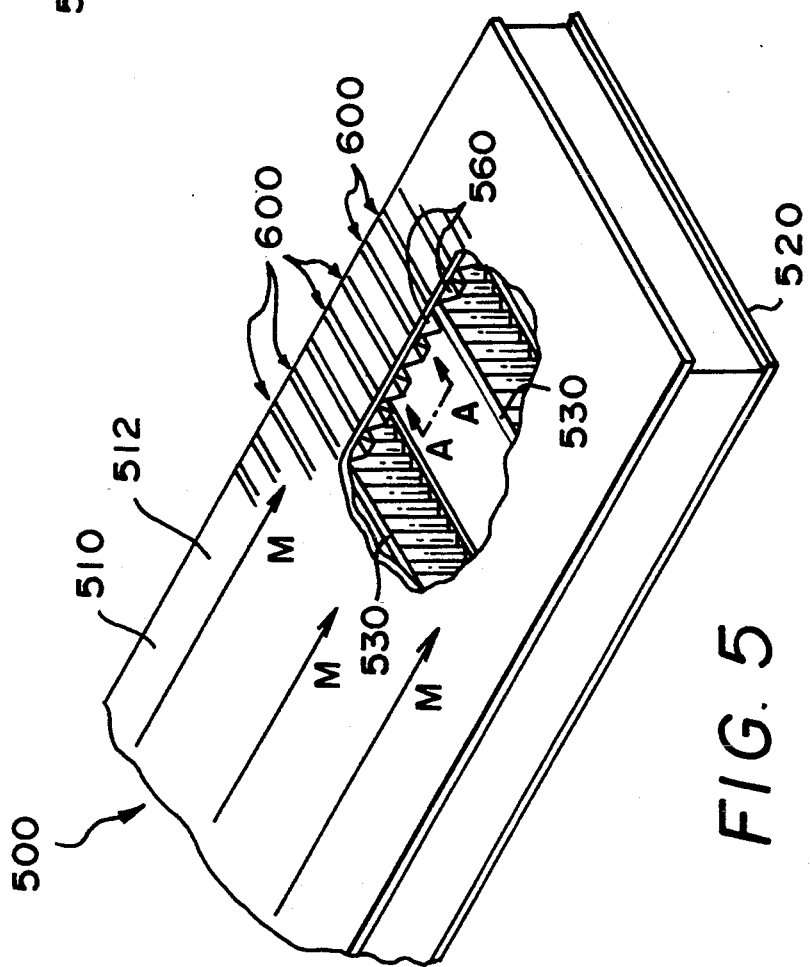
FIG. 5 depicts a section of an actively cooled panel incorporating the structural component of FIG. 4.

FIGS. 5–7 illustrate another application of the composite structural component of the present invention. The utility embraced by this application is quite significant, ranging from cooling of heated panels to laminar flow control to fuel injection.

FIG. 5 shows a structural member 500 having a top panel 510, a bottom panel 520, and a sandwich structure disposed between the top and bottom panels. The member 500 includes structural stiffening members 530 disposed at predetermined spaced locations along the length of the member 500. The stiffening members are provided for rigidifying the top and bottom panels, and incorporate a structural component such as that shown in FIG. 4 containing the hollow fiber reinforcing system taught by the present invention. Disposed on the underside of the top panel 510 are a series of transverse channels 560 which carry a fluid from a source (not shown) located outside the structural member 500 to the upper surface 512 of the top panel, where the fluid is introduced into a mainstream flow M of fluid passing over the top surface 512. Where the mainstream flow M is the exhaust of an engine or turbine, the introduced fluid could be used as a cooling medium. Where the mainstream flow M Is a high speed flow of compressed air, then the introduced fluid could be a fuel.

FIG. 6 is a cross-sectional view of one of the transverse channels shown in FIG. 5 taken at section lines A—A. As shown, the transverse channels are disposed below the top panel 510. Disposed atop and slightly rearwardly of each transverse channel is a hollow fiber reinforced structural component 600 of a type similar to that shown in FIG. 4.

The reinforced structural component includes fibers which extend at a 45° angle to the upper surface 512 of the top panel, and permit escape of the fluid in the channel into the mainstream flow M. Alternatively, If the source of fluid communicating with the channels 560 is a suction-generating apparatus, the channels can be used as a laminar flow control mechanism to entrain the mainstream flow M closely over the upper surface of the top panel.

FIG. 7 is a cross-sectional view of a variation of the panel structure shown in FIG. 5 taken at section lines A—A. As shown in FIG. 7, the transverse channels are disposed below the top panel 510. A hollow fiber reinforced structural component 700 of a type similar to that shown in FIG. 4 is disposed rearwardly of the portion of the top panel overlying the transverse channel 560. In this embodiment, the upper panel is stepped at the location of placement of each fiber-reinforced structural component (see the step at 720), and the fibers in each fiber-reinforced structural component are aligned with the horizontal axis of the component while being disposed parallel to the upper surface of the top panel 510.

FIG. 8 illustrates a transpiration cooling panel 800 for enabling transport of fluid between two environments. This embodiment of the invention would have utility in applications where it is desired to provide cooling to one or more surfaces subjected to extremely high temperatures. The panel 800 includes an upper layer 810 comprised of a structural component of the type shown in FIG. 4, and a monolithic lower layer 820. Disposed between the two layers Is a sandwich member 830, which comprises a metallic or ceramic material fabricated as a honeycomb or sandwich structure to define a plurality of chambers or channels 840. Through holes 850 are provided in predetermined ones of the chamber or channel walls as shown to facilitate fluid communication between various chambers or channels, and the upper and lower face sheets 810, 820 are attached to the sandwich member via brazing or superplastic forming, diffusion bonding techniques.

Use of the transpiration cooling panel involves containment of a coolant inside the sandwich core 830 by the face sheets 810, 820. The panel 800 would be situated such that the exterior surfaces of its upper and/or lower face sheets are exposed to extremely elevated temperature environments.

Heating of these surfaces causes a "wicking" effect of the coolant contained within the sandwich core 830 whereby the coolant passes from the core through the hollow fibers in the upper layer 810 and evaporates at the outer surface 812 of the upper layer. The evaporation of the coolant at the exterior surface of the upper layer facilitates maintaining a constant face sheet temperature at the vaporization point of the coolant material so long as "wicking" continues.

Thus it is apparent that there has been provided, in accordance with the invention, a novel reinforcing fiber for composite materials, as well as a method of making the fibers, a method for making the composites and products incorporating these fibers to enhance the functional capabilities of the structural composites.

These various modes of the present invention fully satisfy the objectives, aims, and advantages set forth above. While the invention may have been described in conjunction with specific embodiments, it is evident that many alternatives, modifications, and variations will be apparent to those skilled in the art in light of the foregoing description. Accordingly, the present invention is intended to embrace all such alternatives, modifications, and variations which fall within the spirit and scope of the appended claims.

What I claim is:

1. A structurally reinforced, creep resistant composite component, comprising: composite metal or ceramic matrix material, a plurality of carbon-coated ceramic hollow reinforcing fibers arranged in said metal or ceramic matrix material in substantial parallel alignment with each other communicating distinct surfaces of said component, wherein herein one of said communicated surface is exposed to a high speed flow of fluid and said carbon-coated ceramic hollow fibers communicate said one surface with a source of suction, whereby said component functions as a laminar flow control panel.

2. A transpiration cooling panel, comprising:
   a first panel comprising a carbon-coated ceramic hollow fiber reinforced composite material,
   a second, solid panel,
   a sandwich assembly disposed between said first and second panels and secured to said panels, said sandwich assembly delimiting channels communicating with said first and second panels, and
   a fluid contained within said sandwich assembly between said first and second panels.

3. The combination of a panel having one surface immersed in a fluid flow and a structural component having one surface disposed adjacent said panel one surface, said component including a plurality of elongated, carbon-coated ceramic hollow fibers embedded in a metal or ceramic matrix material, said fibers being disposed substantially parallel with one another so that opposite ends of said fibers fluidly interconnect two surfaces of said structural component.

4. The combination of claim 3, wherein said one surface of said structural component is disposed downstream of said one surface of said panel, and said fibers are arranged substantially parallel with said one surface of said structural component.

5. The combination of claim 3, wherein said one surface of said structural component forms a part of said panel one surface, and said fibers are arranged at a substantially acute angle to said one surface of said structural component.

* * * * *